(12) United States Patent
Keller

(10) Patent No.: US 6,464,573 B1
(45) Date of Patent: Oct. 15, 2002

(54) GUARD ATTACHMENT SYSTEM WITH KNURLED CLAMP RING

(75) Inventor: David V. Keller, Jackson, TN (US)

(73) Assignee: Porter-Cable Corporation, Jackson, TN (US)

( * ) Notice: Subject to any disclaimer, the term of this patent is extended or adjusted under 35 U.S.C. 154(b) by 0 days.

(21) Appl. No.: 09/608,379

(22) Filed: Jun. 30, 2000

(51) Int. Cl.⁷ ............................................... B24B 55/04

(52) U.S. Cl. .................. 451/451; 451/359; 451/455

(58) Field of Search ............................ 451/442, 451, 451/452, 455, 357, 358, 359

(56) References Cited

U.S. PATENT DOCUMENTS

| | | |
|---|---|---|
| 828,706 A | 8/1906 | Bohling et al. |
| 3,646,712 A | 3/1972 | Quintana |
| 3,818,648 A | 6/1974 | Evans |
| 3,835,595 A | 9/1974 | Oshima et al. |
| 3,876,015 A | 4/1975 | Kivela |
| 3,969,856 A | 7/1976 | Zerrer |
| 4,024,633 A | 5/1977 | Stucker |
| 4,058,936 A | 11/1977 | Marton |
| 4,059,930 A | 11/1977 | Alessio |
| 4,065,886 A | 1/1978 | Harwood et al. |
| 4,125,968 A | 11/1978 | Mackey |
| 4,294,046 A | 10/1981 | Damiano |
| 4,330,967 A | 5/1982 | Richardson |
| 4,400,995 A | 8/1983 | Palm |
| 4,434,586 A | 3/1984 | Müller et al. |
| 4,462,381 A | 7/1984 | Fushiya et al. |
| 4,574,532 A | 3/1986 | Häberle et al. |
| 4,581,966 A | 4/1986 | Kaiser et al. |
| 4,735,020 A | 4/1988 | Schulz et al. |
| 4,848,001 A | 7/1989 | Clark et al. |
| 4,875,398 A | 10/1989 | Taylor et al. |
| 4,891,915 A | 1/1990 | Yasuda |
| 4,924,635 A | 5/1990 | Rudolf et al. |
| 4,932,164 A | 6/1990 | Sullivan et al. |
| 4,955,162 A | 9/1990 | Jackson |
| 4,974,578 A | 12/1990 | Charles et al. |
| 4,989,374 A | 2/1991 | Rudolf et al. |
| 5,005,321 A * | 4/1991 | Barth et al. ................. 451/359 |
| 5,031,325 A | 7/1991 | Walter et al. |
| 5,031,364 A | 7/1991 | Belanger |
| 5,038,523 A | 8/1991 | Farber et al. |
| 5,071,427 A | 12/1991 | Stahl |
| 5,077,942 A | 1/1992 | Jacobsson |
| 5,125,189 A | 6/1992 | Holmin et al. |
| 5,138,735 A | 8/1992 | Kusz et al. |
| 5,207,028 A | 5/1993 | Timmons |
| 5,218,790 A | 6/1993 | Huang |
| 5,263,283 A | 11/1993 | Rudolf et al. |
| 5,384,985 A | 1/1995 | Jacobsson |

(List continued on next page.)

Primary Examiner—Joseph J. Hail, III
Assistant Examiner—Hadi Shakeri
(74) Attorney, Agent, or Firm—Merchant & Gould P.C.

(57) ABSTRACT

A removable guard for a hand-held power tool. The guard is configured to cover an area proximate a spindle assembly of the tool between the spindle assembly and a user of the tool. The guard is further configured to be securely mounted to a semi-elastic lower bearing housing supporting the spindle assembly of the tool. The guard, when mounted to the semi-elastic lower bearing housing of the tool, and when in use during operation of the tool, must remain functional under conditions of flying debris, such as under conditions of an exploding, rotating abrasive grinding wheel mounted on the spindle assembly of the tool.

The guard includes a clamp ring depending from a guard hood. The clamp ring's inner circumferential portion has at least a partially-knurled surface, whereby when securely tightened around the semi-elastic lower bearing housing, the at least partially-knurled surface of the clamp ring inner circumferential portion compresses into the semi-elastic lower bearing housing to securely mount the guard to the tool.

51 Claims, 6 Drawing Sheets

U.S. PATENT DOCUMENTS

| | | |
|---|---|---|
| 5,386,667 A | 2/1995 | Häusslein et al. |
| 5,396,706 A | 3/1995 | Fajnsztajn |
| 5,398,456 A | 3/1995 | Kleider |
| 5,407,381 A | 4/1995 | Schaefer et al. |
| 5,411,433 A | 5/1995 | Keller |
| 5,466,183 A | 11/1995 | Kirn et al. |
| 5,527,207 A | 6/1996 | Azar et al. |
| 5,531,147 A | 7/1996 | Serban |
| 5,558,569 A | 9/1996 | Lee |
| 5,558,571 A | 9/1996 | Toyoshima et al. |
| 5,624,305 A | 4/1997 | Brown |
| 5,637,035 A * | 6/1997 | Yee ............................. 451/358 |
| 5,679,066 A | 10/1997 | Butz et al. |
| 5,681,214 A | 10/1997 | Kleider et al. |
| 5,733,183 A | 3/1998 | Schierling et al. |
| 5,766,062 A * | 6/1998 | Edling ......................... 451/359 |
| 5,794,300 A | 8/1998 | McCracken et al. |
| 5,839,359 A | 11/1998 | Gardner |
| 5,839,950 A | 11/1998 | Johansson Edling et al. |
| 5,940,976 A | 8/1999 | Söderqvist et al. |
| 6,120,362 A * | 9/2000 | Etter et al. .................. 451/359 |

\* cited by examiner

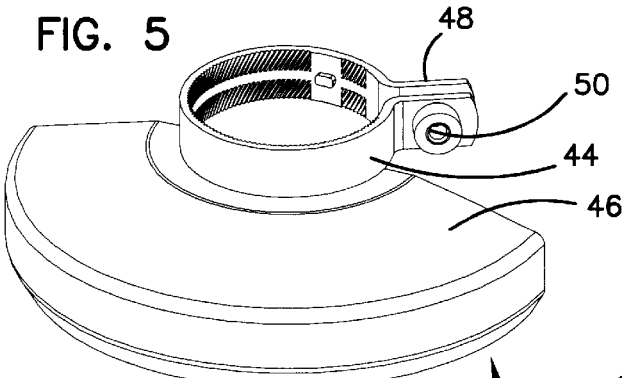
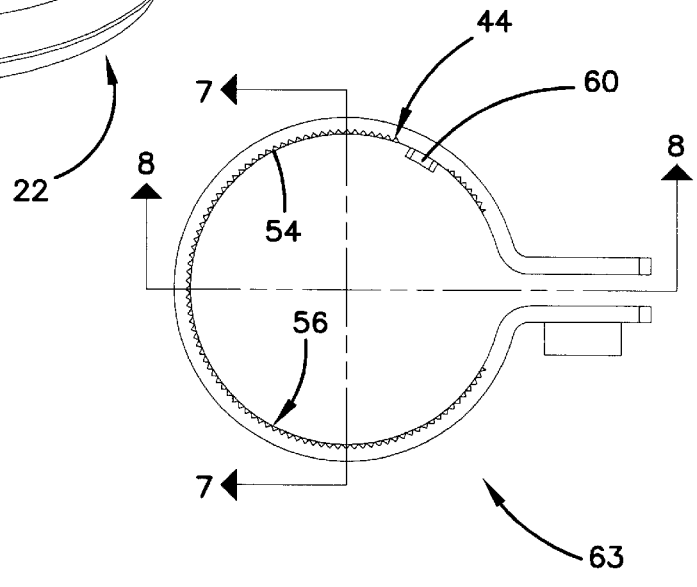
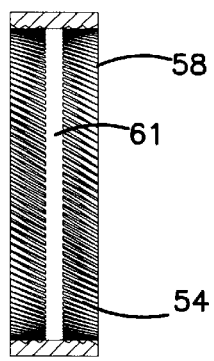
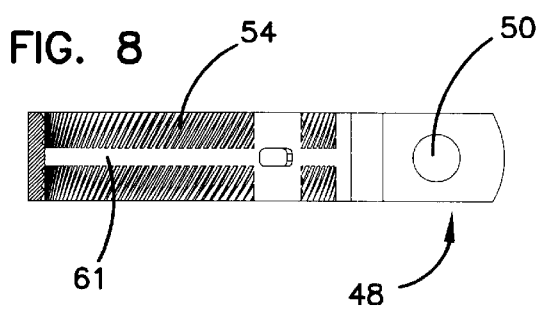
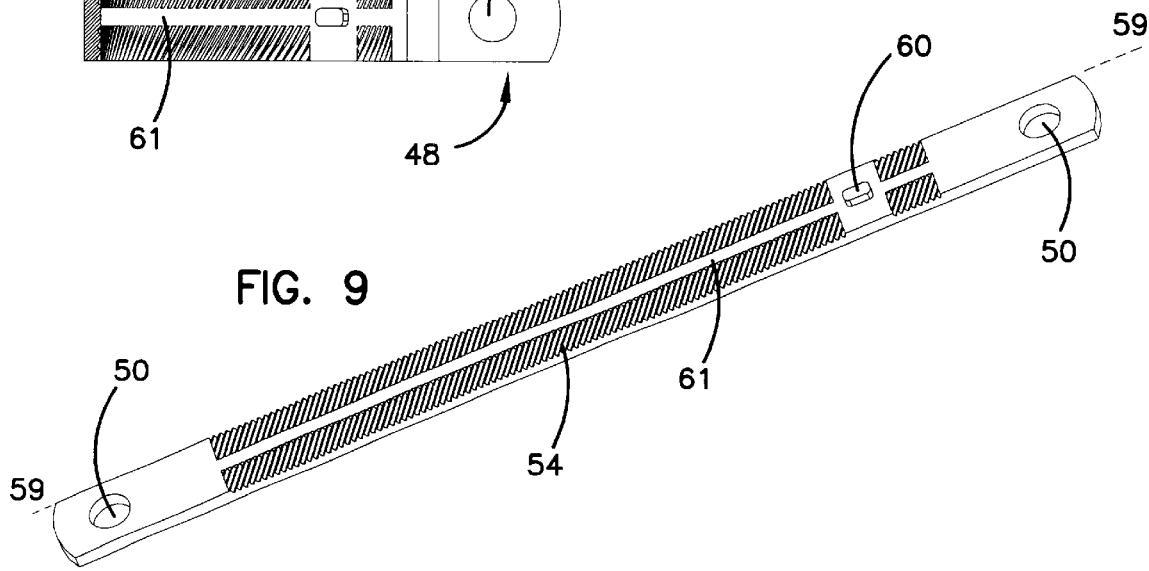

GUARD ATTACHMENT SYSTEM WITH KNURLED CLAMP RING

FIELD OF THE INVENTION

This invention relates generally to removable guard members for power tools, and, in particular, to a removable guard member for hand-held power tools such as an angle grinder wherein the inner circumferential portion of the clamp ring of the guard has at least a partially-knurled surface.

BACKGROUND OF THE RELATED ART

Conventional power tools use a guard to protect users and others in the area from debris, or possibly grinding wheel fragments. Such guards are especially useful in hand-held grinding/sanding power tools such as angle grinders having spindles on which work wheels, e.g., grinding wheels, sanding wheels, and the like, are mounted.

In a typical guard, one used on an angle grinder for example, the guard is mounted onto the lower bearing housing of the angle grinder.

The guard typically includes a clamp ring and a guard hood. The clamp ring mounts onto a flange of the lower bearing housing.

The clamp ring is typically a stamped metal ring. In the past, the inner circumferential portion of the clamp ring has generally been of a smooth texture. The flange of the lower bearing housing has generally been a machined aluminum part. While this guard, used in combination with the machined-aluminum lower bearing housing, has been sufficient to pass UL/ANSI-standard guard testing procedures, the machined-aluminum lower bearing housing is expensive to manufacture.

SUMMARY OF THE INVENTION

In accordance with the present invention, the above and other problems are solved by providing a removable guard for a power tool able to utilize, and preferably used in conjunction with, a semi-elastic lower bearing housing. The guard, typically for a hand-held angle grinder, includes a clamp ring which has at least a partially-knurled surface located on its inner annular circumferential portion.

In the present invention, a removable guard is configured to cover an area proximate a spindle assembly of the tool, such as an angle grinder, between the spindle assembly and a user of the tool. The guard is configured to be securely mounted to a lower bearing housing, supporting the spindle assembly of the tool, and being formed of a semi-elastic material such as a molded polymer-based lower bearing housing, or any suitable semi-elastic component made of including, but not limited to, non-polymeric materials, non-polymeric composites, polymer composites, and polymer materials containing filling agents or plasticizers. The guard, when mounted to the lower bearing housing, and when in use during operation of the tool, is designed to remain functional even under conditions of flying debris, or grinding wheel fragments, such as under conditions of an exploding, rotating abrasive wheel mounted on the semi-elastic lower bearing housing of the tool.

The guard includes a guard hood configured to cover the area proximate the spindle assembly, between the spindle assembly and the user of the tool. A clamp ring depends from, and is mechanically coupled, to the guard hood.

The clamp ring has an inner circumferential portion and is configured so that the inner circumferential portion at least partially surrounds, and can be securely tightened around, at least a portion of the semi-elastic lower bearing housing. The clamp ring is configured so that at least a portion of the semi-elastic lower bearing housing can pass essentially concentrically through the clamp ring.

The inner circumferential portion of the clamp ring defines at least a partially-knurled surface. When the clamp ring is securely tightened around the semi-elastic lower bearing housing, the at least partially-knurled surface of the clamp ring inner circumferential portion compresses into the semi-elastic lower bearing housing to securely mount the guard member to the machine tool.

The power tool, typically an angle grinder, to which the guard attaches has a motor housing and a gear housing portion. The gear housing is adjacent the lower bearing housing. The lower bearing housing supports the spindle assembly, and the spindle extends outwardly from the lower bearing housing. The spindle of the spindle assembly includes a tool attachment portion. The lower bearing housing includes a flange to which the guard is secured.

BRIEF DESCRIPTION OF THE DRAWINGS

FIG. 5 illustrates a perspective view of the guard in an embodiment of the present invention;

FIG. 6 illustrates a top plan view of the clamp ring, shown without the guard hood, in an embodiment of the present invention;

FIG. 7 illustrates a cross-sectional view of the clamp ring of FIG. 6 taken generally along line 7—7:

FIG. 8 illustrates a cross-sectional view of the clamp ring of FIG. 6 taken generally along line 8—8;

FIG. 9 illustrates a perspective view of the clamp ring of FIG. 6 in a flattened out position;

DETAILED DESCRIPTION OF AN EMBODIMENT

The present invention provides a removable guard for a hand-held power tool, typically an angle grinder. The guard may be utilized on various sized tools, for example, a 4½', 5" or a 6" angle grinder. The guard includes a clamp ring. The clamp ring's inner circumferential surface defines at least a partially-knurled surface. The semi-elastic lower bearing housing of the angle grinder has a flange to which the clamp ring attaches.

Figure 1:
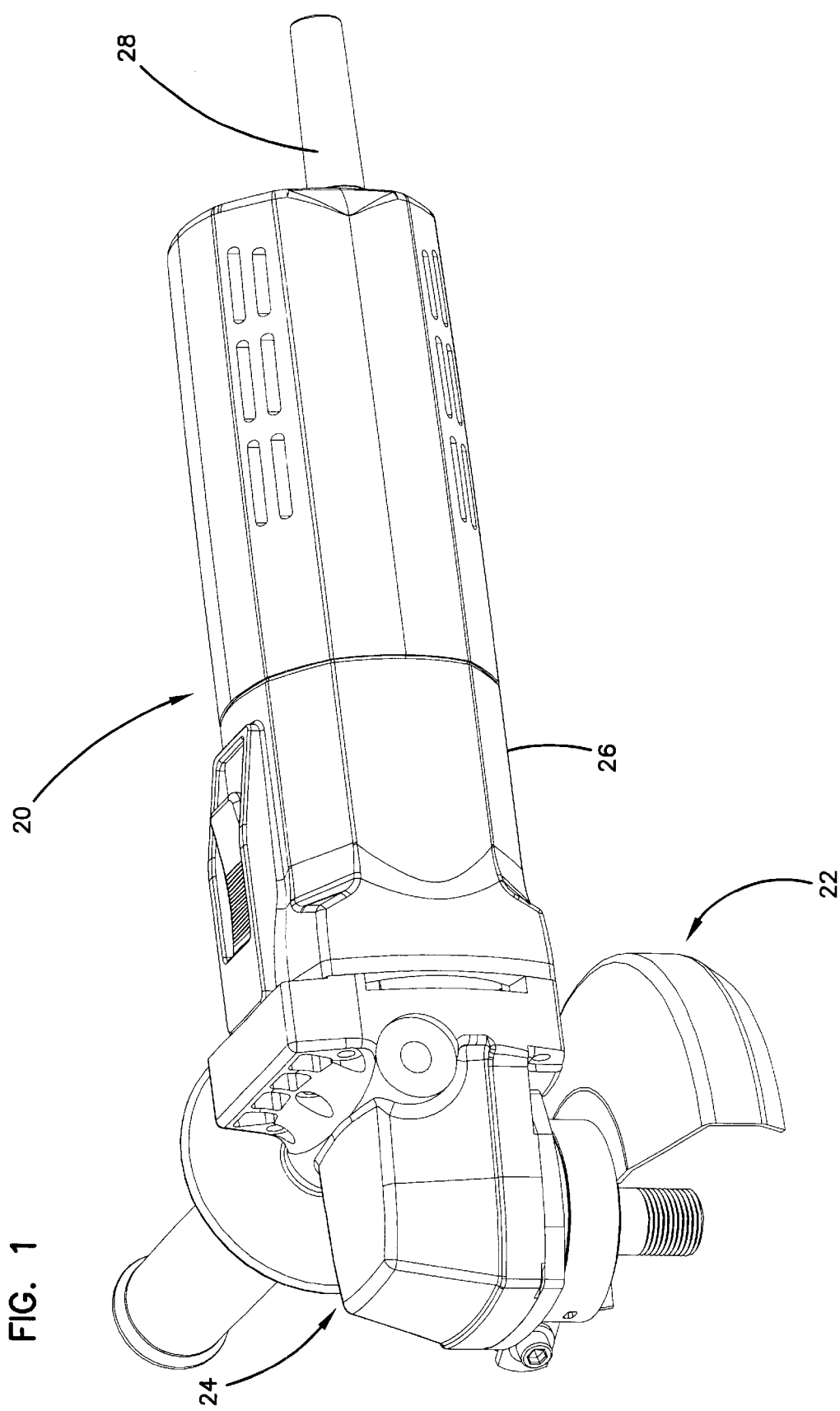
FIG. 1 illustrates a perspective view of an angle grinder, with an attached guard in a possible embodiment of the present invention.

Referring now to FIG. 1, which illustrates a conventional hand-held power tool 20, here an angle grinder, featuring one possible embodiment of the guard of the present invention, shown generally as 22. The angle grinder 20 includes a gear housing portion 24 and a motor housing portion 26. A motor (not shown) is mounted in the motor housing portion 26 and an electric power supply cord 28 extends from the back of the motor housing portion to power the motor.

Figure 2:
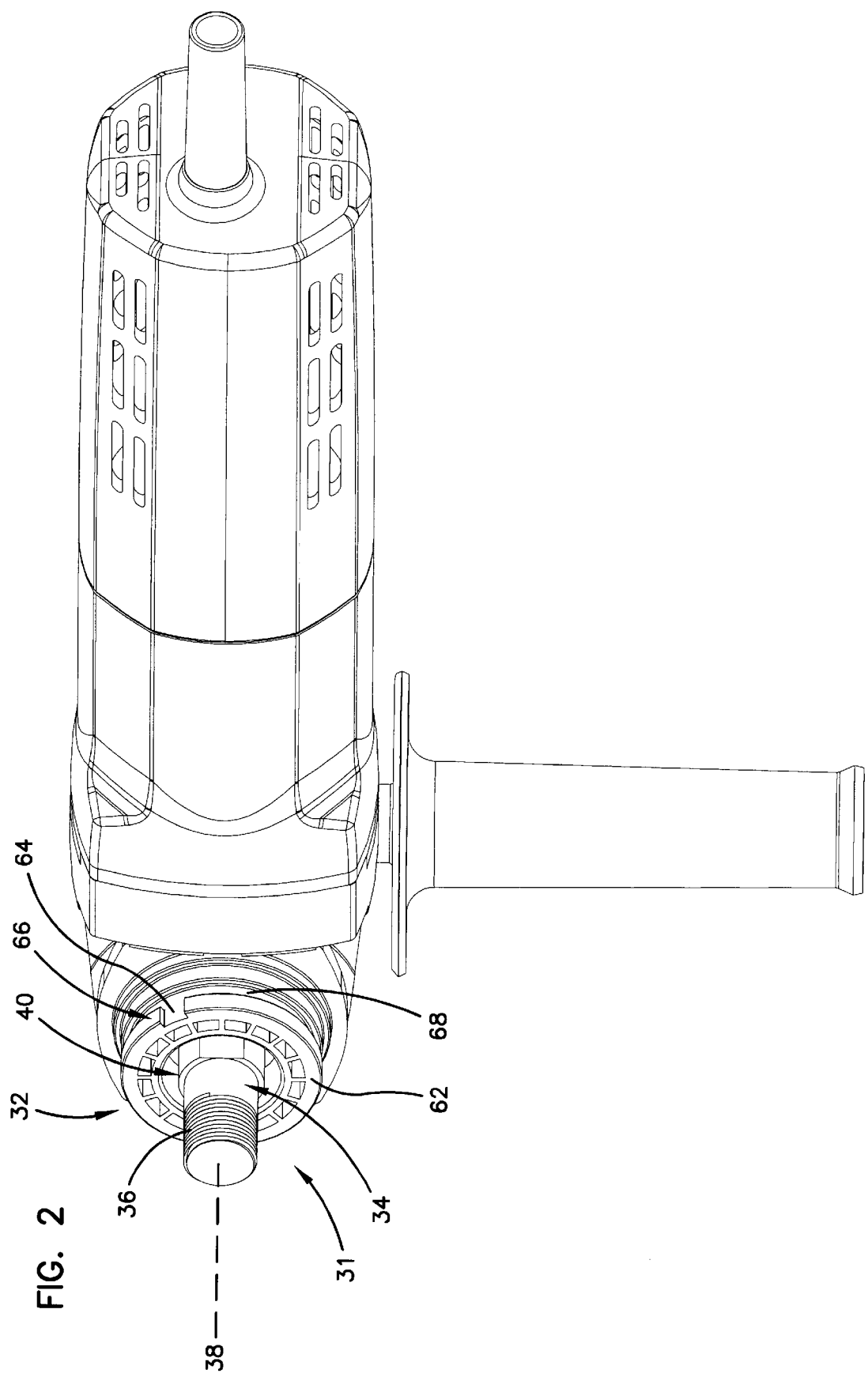
FIG. 2 illustrates a bottom perspective view of the angle grinder of FIG. 1, without the guard attached.
Figure 3:
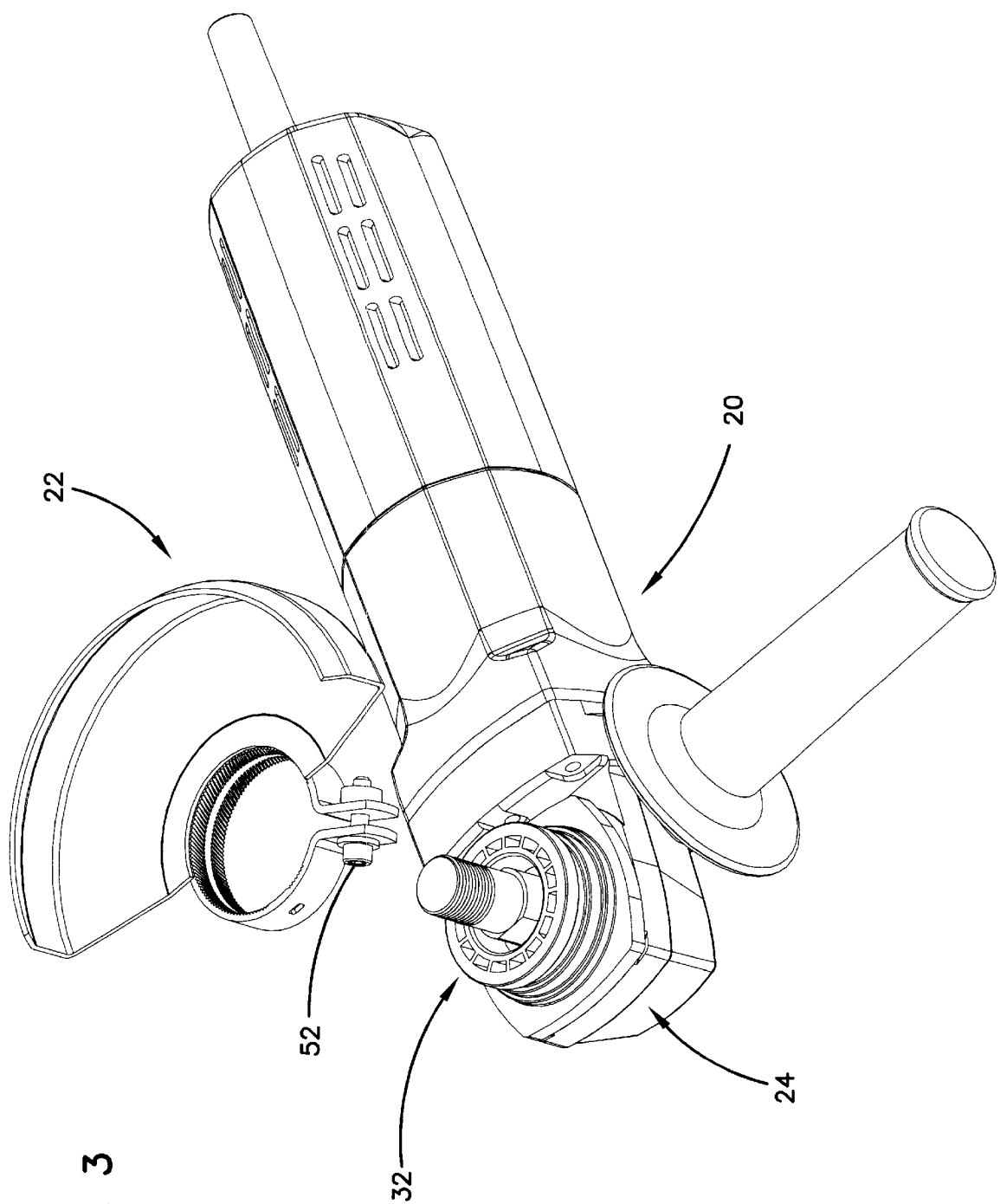
FIG. 3 illustrates a bottom perspective view of the angle grinder and guard of FIG. 1, with the guard in a detached position.

As seen in FIGS. 2 and 3, a lower bearing housing 31 is positioned adjacent the gear housing portion 24. The lower bearing housing 31 includes flange 32. The lower bearing housing is constructed to accept a guard to be attached thereto, as will be discussed in greater detail below.

The angle grinder 20 also includes a spindle assembly 34. The spindle assembly 34 is supported by the lower bearing housing 31 and includes a spindle 36 extending outward from the lower bearing housing. The spindle has an axis of rotation 38 and a tool attachment portion 40 on which a grinding wheel (not shown) is mountable. The spindle assembly 34 also includes a nut (not shown) that can be threaded onto the tool attachment portion 40 to secure the grinding wheel in place. The angle grinder 20 is shown without a grinding wheel attached to its spindle 36.

The guard 22 is shown attached to the angle grinder in FIG. 1, in an embodiment of the present invention.

Figure 4:
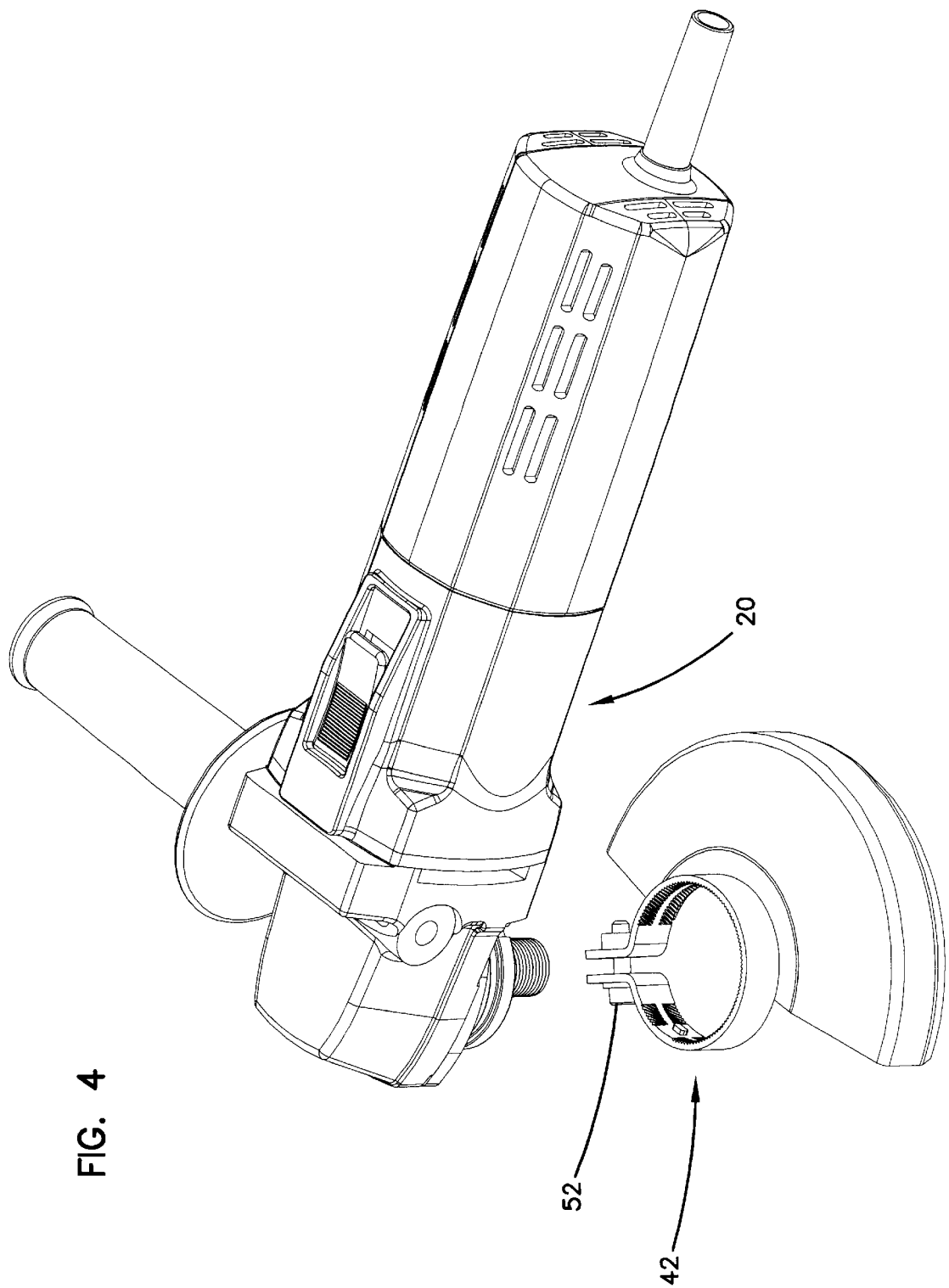
FIG. 4 illustrates a perspective view of the angle grinder of FIG. 1, with the guard in a detached position.

In FIGS. 3 and 4, the guard 22 is shown detached from the angle grinder 20.

Referring now to FIG. 5, which shows a perspective view of the guard 22 according to one embodiment of the present invention. The guard 22 includes a clamp ring 44. The guard also includes a guard hood 46. The clamp ring 44 is preferably mechanically coupled to, and depends from, the guard hood 46.

In an alternative embodiment, the guard 22 may include an additional plate depending from the guard hood 46, opposite the clamp ring 44, for further protection. Typically this additional plate (not shown) covers the underside of the abrasive grinding wheel attached to the angle grinder.

The guard hood 46 typically is configured to cover an area proximate the spindle assembly 34 of the angle grinder, between the spindle assembly and the user of the tool. The guard hood 46 is preferably stamped steel.

The clamp ring 44 is typically annular-shaped and depends from the guard hood 46 in a co-axial direction. The clamp ring 44 is typically a piece of rolled-steel welded to the guard hood 46. The clamp ring 44 may be secured to the guard hood 46 in other ways.

The clamp ring 44 has extending tabs 48 on each of its ends. The extending tabs have aligning holes 50 defined by the tabs 48. The holes 50 are configured so as to accept a clamp screw 52 (FIGS. 3 and 4) for the purpose of securely tightening the inner circumferential portion of the clamp ring 44 around the flange 32 of the lower bearing housing 31.

The clamp screw 52 is inserted through aligned holes 50 in each extending tab 48 of the clamp ring 44, and tightened when the clamp ring is mounted in place.

FIG. 6 shows a top plan view of the clamp ring 44, without the depending guard hood 46, in an embodiment of the present invention. The inner circumferential portion 56 of the clamp ring 44 has at least a partially-knurled surface 54. During use, when the clamp ring is securely tightened around the flange 32 of the lower bearing housing 31, the partially-knurled surface 54 of the clamp ring 44 inner circumferential portion 56 compresses into the lower bearing housing 31 to securely mount the guard member 22 to the angle grinder 20 (FIG. 2).

The partially-knurled surface 54 of the clamp ring 44 generally is substantially raised, spaced-apart ridges 58. In an embodiment of the present invention, as shown in FIGS. 7–9, the ridges 58 are oriented on a diagonal so as to cause the guard 22, when a piece of debris such as a piece of the rotating abrasive wheel (mounted on the spindle assembly) impacts the guard hood 46 with sufficient force to cause the guard to move, the guard 22 grips with a tightening function and remains properly secured onto the flange 32 of the angle grinder 20. When impacted sufficiently, the guard is able to act in a screw-like motion and rotate itself so that if further secures itself onto the flange 32 of the angle grinder 20. Accordingly, the raised ridges 58 of the clamp ring should be on an angle relative to the circumferential axis 59, for example at 30°, to cause this gripping and tightening movement. However, any angle of the ridges that will cause such gripping and tightening of the guard is adequate.

The ridges 58 of knurling per inch may vary. A consideration of the number of ridges per inch, besides the effectiveness of the guard to perform as desired, is also the ease of manufacturing and cost of the knurling operation.

In one embodiment of the present invention, as shown in FIGS. 7–9, the portions of knurl may be separated by a smooth surface 61 around the inner circumferential portion 56 of the clamp ring 44. This is because this smooth surface 61 area generally aligns with the annular groove of the flange 32 (discussed below), and therefore would not necessarily add additional grip by being knurled, and also for ease and cost of manufacture.

Figure 10:
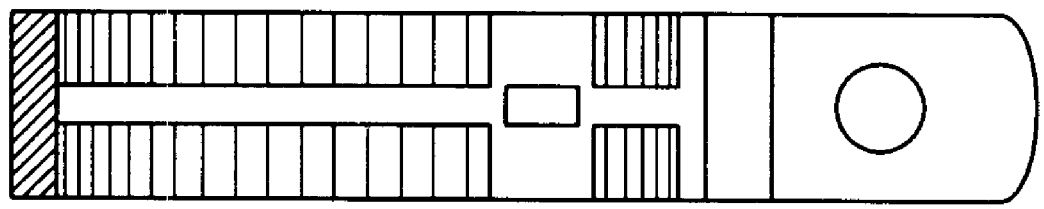
FIG. 10 illustrates an alternative pattern of knurling in a possible embodiment of the present invention.
Figure 11:
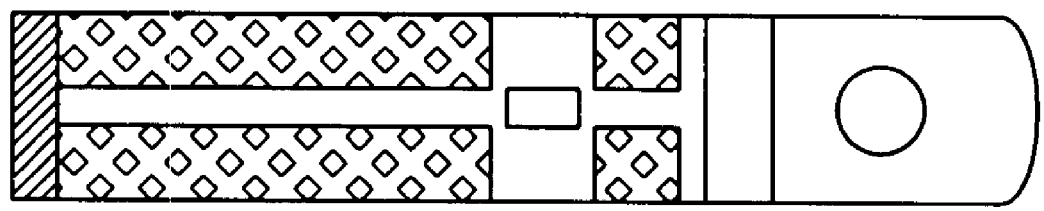
FIG. 11 illustrates another alternative pattern of knurling in a possible embodiment of the present invention.

In alternative embodiments, the pattern of knurling may change. A variety of knurl configurations is possible. For example, instead of the partially-knurled surface 54 being substantially diagonal, spaced apart ridges 58, the knurling may be a straight knurl (as seen in FIG. 10), or a diamond knurl (as seen in FIG. 11). In such case, the guard 22 is still able to sufficiently grip, and remain properly secured onto, the flange 32.

The guard 22, and the knurling 54 on the clamp ring 44, may be created by various processes. A preferred process of creating the partially-knurled surface 54 is to knurl the clamp ring while in a flat position, as shown in FIG. 9. The clamp ring 44 is then formed into its round shape, and welded onto the guard hood 46. Other suitable methods of knurling and manufacturing of the guard may also be used.

In one embodiment, the inner circumferential portion 56 of the clamp ring 44 may also have either no protrusion or at least one protrusion 60 (FIG. 6) for a further means of securing the guard 22 to the flange 32 of the lower bearing housing 31. The protrusions 60 generally extend radially-inwardly from the clamp ring 44, and extend beyond the most interior extent of the partially-knurled surface 54. If only one protrusion exists, it is typically positioned on the clamp ring 44, so that when the guard 22 is positioned onto the flange 32, it must be rotated within the annular groove of the flange (discussed below) to be in a proper working position between the spindle assembly and the operator, and therefore adds additional securement of the guard to the lower bearing housing 31.

The protrusions 60 are typically made by a controlled piercing or punching of the clamp ring 44 from its outside surface 63 to form the protrusion 60 on its inner circumferential portion 56.

As mentioned above, the angle grinder 20 to which the guard 22 attaches has a flange 32 (FIG. 2) for the guard 22 to be secured to. The flange 32 has end 62. The flange has an appropriate number of axial grooves 64 cut into its outside circumferential surface 66 to mate with related protrusions 60 on the clamp ring 44 of the guard 22. The axial grooves 64 begin at end 62 of the mounting flange. If the clamp ring has at least one protrusion 60, each protrusion of the clamp ring 44 fits into an axial groove 64 on the flange 32 to allow the clamp ring 44 to fit over the flange.

If the clamp ring 44 includes protrusions 60 extending therefrom, the flange 32 of the angle grinder 20 also includes an annular groove 68 cut into its outside circumferential surface 66. Once the clamp ring 44 is fit over the flange 32, each protrusion 60 will align with the annular groove 68 in the flange. The fit of each protrusion into the annular groove of the flange allows rotation of the guard 22 attachment to its desired location.

The lower bearing housing 31 is typically formed of a semi-elastic material such as a molded polymer-based component, or any suitable semi-elastic component made of including, but not limited to, non-polymeric materials, non-polymeric composites, polymer composites, and polymer materials containing filling agents or platicizers. Previously, the lower bearing housing 31 was typically a machined aluminum part, which is comparatively relatively more expensive to manufacture. The combination of the partially-knurled surface 54 located on the inner circumferential portion 56 of the clamp ring 44 and the semi-elastic lower bearing housing 31, such as a lower bearing housing formed of a molded polymer-based material, provides sufficient gripping action of the guard 22 onto the flange 32 such that it passes the UL/ANSI-standard test requirements for such a tool.

UL/ANSI-standard test requirements for such a tool include passing a testing procedure where the abrasive wheel (not shown) is purposely burst at a higher speed of rotation than is normal for operation. The guard 22 must withstand the impact of the fragments of the wheel such that all fragments are contained or deflected through an arc of 180° in the plane of wheel rotation. Also, the guard can not be separated from the tool, but must protect an area known as the "no-fragment zone " (generally between the spindle assembly and the user) from flying debris, or from any fasteners or mounting hardware from entering it.

In the past, the UL/ANSI-standard test requirements for power tools and their attached guards were typically met by having a clamp ring having an inner circumferential portion with a smooth surface used in conjunction with a machined-aluminum lower bearing housing and flange. In the present invention, the clamp ring 44 with at least a partially-knurled surface 54 located on its inner circumferential portion 56, used in conjunction with the semi-elastic lower bearing housing 31, also provides sufficient UL/ANSI-standard test requirement results.

When the guard 22 is in its desired location, typically between the operator and the grinding wheel (not shown), the clamp screw 52 is tightened to secure the clamp ring 44 around the flange 32 and hold the guard 22 in place.

In use, the guard 22 is attached to the flange 32 formed of semi-elastic material such as a molded polymer-based material. The flange 32 is typically an integral part of the lower bearing housing 31 of the angle grinder 20. Any protrusions 60 located on the inner circumferential portion 56 of the clamp ring 44 of the guard 22 will align with axial grooves 64 positioned in the outside circumferential surface 66 of the flange 32. The guard 22 is then slid onto the flange 32.

Once the clamp ring 44 is fit over the flange 32, each protrusion 60, if any, will align with the annular groove 68 in the flange 32. The fit of each protrusion into the annular groove 68 of the flange 32 allows rotation of the guard 22 attachment to its desired location. The guard 22 is rotated to its desired location, typically between the operator and the grinding wheel.

The clamp screw 52 is then tightened to further secure the clamp ring 44 onto the flange 32. Other types of tightening devices, such as lever-operated devices, may also be used.

When securely tightened around the semi-elastic lower bearing housing 31, the at least partially-knurled surface 54 of the clamp ring 44 inner circumferential portion 56 compresses into the semi-elastic lower bearing housing 31 to securely mount the guard 22 to the angle grinder 20.

During use of an embodiment of the present invention, if a piece of debris impacts the guard hood 46 of the guard 22, the guard clamping is such that the guard will protect the operator by absorbing the impact of the collision, and remain properly secured on the angle grinder 42 with a gripping function and tightening onto the angle grinder 20 in a screw-like manner, as directed by the orientation of the partially-knurled surface 54 of the clamp ring 44.

It is to be understood that the invention is not intended to be limited to the specific preferred embodiments of the guard member set forth above. Rather, it is to be taken as including all reasonable equivalents to the subject matter of the appended claims.

I claim:

1. A removable power tool guard configured to cover an area proximate a spindle assembly of a power tool between a spindle assembly and a user of the tool, the guard further being configured to be securely mounted to a semi-elastic lower bearing housing supporting the spindle assembly of the power tool, wherein the guard, when mounted to the lower bearing housing, and when in use during operation of the tool, must remain in place even under conditions of flying debris, such as under conditions of an exploding, rotating abrasive grinder wheel mounted on the lower bearing housing of the tool, the guard comprising:

a guard hood configured to cover an area proximate the spindle assembly between the spindle assembly and the user of the tool;

a clamp ring mechanically coupled to the guard hood;

the clamp ring depending from the guard hood;

the clamp ring having an inner circumferential portion;

the clamp ring being configured so that the inner circumferential portion at least partially surrounds, and can be secured tightly around, at least a portion of the semi-elastic lower bearing housing;

the clamp ring being configured so that at least a portion of the semi-elastic lower bearing housing can pass essentially concentrically through the clamp ring;

the inner circumferential portion of the clamp ring defining at least a partially-knurled surface; and whereby, when securely tightened around the semi-elastic lower bearing housing, the at least partially-knurled surface of the clamp ring inner circumferential portion compresses into the semi-elastic lower bearing housing to securely mount the guard member to the tool.

2. The guard of claim 1 wherein the partially-knurled surface comprises substantially raised, spaced-apart ridges orientated relative to a circumferential axis of the clamp ring so as to provide a gripping and tightening function in relation to a flange of the lower bearing housing.

3. The guard of claim 2 wherein the clamp ring is able to behave in a screw-like manner with relation to the flange in its gripping and tightening function.

4. The guard of claim 2 wherein the partially-knurled surface has portions of knurl separated by a non-knurled surface around the inner circumferential portion of the clamp ring.

5. The guard of claim 2 wherein the knurling has approximately 10–33 ridges per inch.

6. The guard of claim 1 wherein the partially-knurled surface comprises a diagonal knurl.

7. The guard of claim 1 wherein the partially-knurled surface comprises a straight knurl.

8. The guard of claim 1 wherein the partially-knurled surface comprises a diamond knurl.

9. The guard of claim 1 wherein the clamp ring is annular-shaped and depends from the guard hood in a co-axial direction.

10. The guard of claim 1 wherein when in use, the partially-knurled surface acts to cause the guard to further secure itself to the semi-elastic lower bearing housing with a gripping/tightening function by turning in a screw-like manner on the semi-elastic lower bearing housing.

11. The guard of claim 1 wherein the clamp ring has extending tabs with holes defined by the tabs, wherein the holes are configured to accept a clamp screw for the purpose of securely tightening the inner circumferential portion of the clamp ring around the lower bearing housing.

12. The guard of claim 1 wherein the guard is secured to the semi-elastic lower bearing housing, the semi-elastic lower bearing housing comprising a flange around which the clamp ring is secured.

13. The guard of claim 11 wherein the inner circumferential portion of the clamp ring has at least one protrusion member extending radially inward beyond the most interior extent of the knurling.

14. The guard of claim 13 wherein the flange of the semi-elastic lower bearing housing comprises an outside circumferential surface having at least the same number of axial grooves as the clamp ring of claim 13 has protrusion members, wherein the axial grooves are spaced on the flange so as to align with the at least one protrusion member on the inner circumferential portion of the clamp ring.

15. The guard of claim 14 wherein the outside circumferential surface of the flange to which the guard is secured further comprises an annular groove, the annular groove being positioned so as to accept the at least one protrusion member on the inner circumferential portion of the clamp ring when the guard is inserted onto the flange.

16. The guard of claim 1 wherein the semi-elastic lower bearing housing is formed of a material comprising a molded polymer-based material.

17. The guard of claim 1 wherein the semi-elastic lower bearing housing consists of molded polymer-based material.

18. A removable guard configured to attach to an angle grinder, the angle grinder having a motor housing portion and a gear housing portion, a semi-elastic lower bearing housing adjacent the gear housing portion with the semi-elastic lower bearing housing supporting a spindle assembly with the spindle extending outwardly from the lower bearing housing, the spindle including a tool attachment portion, the semi-elastic lower bearing housing having a flange to which the guard is secured so that when the angle grinder is in use, the guard will remain in place even under conditions such as an exploding, rotating abrasive grinder wheel mounted on the semi-elastic lower bearing housing of the angle grinder, the guard comprising:

a guard hood configured to cover an area proximate the spindle assembly between the spindle assembly and a user of the angle grinder;

a clamp ring depending from, and coupled to, the guard hood;

the clamp ring having an inner circumferential portion;

the clamp ring being configured so that the inner circumferential portion at least partially surrounds, and can be secured tightly around, the flange of the semi-elastic lower bearing housing;

the clamp ring being configured so that at least a portion of the semi-elastic lower bearing housing can pass essentially concentrically through the clamp ring;

the inner circumferential portion of the clamp ring defining at least a partially-knurled surface; and whereby, when securely tightened around the flange of the semi-elastic lower bearing housing, the at least partially-knurled surface of the clamp ring inner circumferential portion compresses into the flange of the semi-elastic lower bearing housing to securely mount the guard to the angle grinder.

19. The guard of claim 18 wherein the partially-knurled surface comprises raised, spaced-apart ridges orientated relative to a circumferential axis of the clamp ring so as to provide a gripping and tightening function in relation to the flange.

20. The guard of claim 19 wherein the clamp ring is able to behave in a screw-like manner with relation to the flange in its gripping and tightening function.

21. The guard of claim 19 wherein the partially-knurled surface has portions of knurl separated by a non-knurled surface around the inner circumferential portion of the clamp ring.

22. The guard of claim 19 wherein the knurling is a medium-pitch knurl having approximately 21 ridges per inch.

23. The guard of claim 18 wherein the partially-knurled surface comprises a diagonal knurl.

24. The guard of claim 18 wherein the partially-knurled surface comprises a straight knurl.

25. The guard of claim 18 wherein the partially-knurled surface comprises a diamond knurl.

26. The guard of claim 18 wherein the clamp ring is annular-shaped and depends from the guard portion in a co-axial direction.

27. The guard of claim 18 wherein when in use, the partially-knurled surface acts to cause the guard to further secure itself to the semi-elastic lower bearing housing with a gripping and tightening function by turning in a screw-like manner on the semi-elastic lower bearing housing.

28. The guard of claim 18 wherein the clamp ring has extending tabs with holes defined by the tabs, wherein the holes are configured to accept a clamp screw for the purpose of securely tightening the inner circumferential portion of the clamp ring around the flange.

29. The guard of claim 18 wherein the inner circumferential portion of the clamp ring has at least one protrusion member extending radially inward beyond the most interior extent of the knurling.

30. The guard of claim 29 wherein the flange of the semi-elastic lower bearing housing comprises an outside circumferential surface having at least the same number of axial grooves as the clamp ring of claim 29 has protrusion members, wherein the axial grooves are spaced on the flange so as to align with the at least one protrusion member on the inner circumferential portion of the clamp ring.

31. The guard of claim 30 wherein the outside circumferential surface of the flange to which the guard is secured further comprises an annular groove, the annular groove positioned so as to accept the at least one protrusion member on the inner circumferential portion of the clamp ring when the guard is inserted into the flange.

32. The guard of claim 18 wherein the semi-elastic lower bearing housing is formed of a material comprising a molded polymer-based material.

33. The guard of claim 18 wherein the semi-elastic lower bearing housing consists of molded polymer-based material.

34. An angle grinder system comprising:
- an angle grinder comprising a motor, a motor-housing portion, and a gear-housing portion;
- a semi-elastic lower bearing housing coupled to the gear housing portion;
- the semi-elastic lower bearing housing supporting a spindle assembly, with a spindle extending outwardly from the lower bearing housing;
- the spindle having a tool attachment portion;
- the semi-elastic lower bearing housing comprising a flange to which a guard is secured;
- the guard comprising a guard hood configured to cover an area proximate the spindle assembly between the spindle assembly and a user of the tool;
- a clamp ring depending from, and being coupled to, the guard hood;
- the clamp ring having an inner circumferential portion;
- the clamp ring being configured so that the inner circumferential portion at least partially surrounds, and can be secured tightly around, at least a portion of the flange of the semi-elastic lower bearing housing;
- the inner circumferential portion of the clamp ring defining at least a partially-knurled surface; and
- whereby, when securely tightened around the flange of the semi-elastic lower bearing housing, the at least partially-knurled surface of the clamp ring inner circumferential portion compresses into the semi-elastic lower bearing housing to securely mount the guard to the tool.

35. The guard of claim 34 wherein the partially-knurled surface comprises substantially raised, spaced-apart ridges orientated relative to a circumferential axis of the clamp ring so as to provide a gripping and tightening function in relation to the flange.

36. The guard of claim 35 wherein the clamp ring is able to behave in a screw-like manner with relation to the flange in its gripping and tightening function.

37. The guard of claim 35 wherein the partially-knurled surface has portions of knurl separated by a non-knurled surface around the inner circumferential portion of the clamp ring.

38. The guard of claim 34 wherein the knurling has approximately 10–33 ridges per inch.

39. The guard of claim 34 wherein the partially-knurled surface comprises a diagonal knurl.

40. The guard of claim 34 wherein the partially-knurled surface comprises a straight knurl.

41. The guard of claim 34 wherein the partially-knurled surface comprises a diamond knurl.

42. The guard of claim 34 wherein when the guard is in use during operation of the angle grinder, the guard remains in place even under conditions of flying debris, such as under conditions of an exploding, rotating broken grinding wheel mounted on the angle grinder.

43. The guard of claim 42, whereby when in use, the partially-knurled surface acts to cause the guard to further secure itself to the semi-elastic lower bearing housing with a gripping and tightening function by turning in a screw-like manner on the semi-elastic lower bearing housing.

44. The guard of claim 34 wherein the clamp ring is configured so that at least a portion of the semi-elastic lower bearing housing can pass essentially concentrically through the clamp ring.

45. The guard of claim 34 wherein the clamp ring is annular-shaped and depends from the guard portion in a co-axial direction.

46. The guard of claim 34 wherein the clamp ring has extending tabs with holes defined by the tabs, wherein the holes are configured to accept a clamp screw for the purpose of securely tightening the inner circumferential portion of the clamp ring around the flange.

47. The guard of claim 34 wherein the inner circumferential portion of the clamp ring has at least one protrusion member extending radially inward beyond the most interior extent of the knurling.

48. The guard of claim 47 wherein the flange of the semi-elastic lower bearing housing comprises an outside circumferential surface having at least the same number of axial grooves as the clamp ring of claim 47 has protrusion members, wherein the axial grooves are spaced on the flange so as to align with the at least one protrusion member on the inner circumferential portion of the clamp ring.

49. The guard of claim 48 wherein the outside circumferential surface of the flange to which the guard is secured further comprises an annular groove, the annular groove positioned so as to accept the at least one protrusion member on the inner circumferential portion of the clamp ring when the guard member is inserted onto the flange.

50. The guard of claim 34 wherein the semi-elastic lower bearing housing is formed of a material comprising a molded polymer-based material.

51. The guard of claim 34 wherein the semi-elastic lower bearing housing consists of molded polymer-based material.

* * * * *